United States Patent
Moore et al.

(10) Patent No.: US 8,762,841 B2
(45) Date of Patent: Jun. 24, 2014

(54) CONTEXTUAL ALERT BUBBLES FOR ALERT MANAGEMENT

(75) Inventors: Martin T. Moore, Somerville, MA (US);
Werner Geyer, Boston, MA (US);
Michael Muller, Medford, MA (US);
Shilad W. Sen, Minneapolis, MN (US);
Michael C. Wu, Vancouver (CA)

(73) Assignee: International Business Machines Corporation, Armonk, NY (US)

( * ) Notice: Subject to any disclaimer, the term of this patent is extended or adjusted under 35 U.S.C. 154(b) by 2100 days.

(21) Appl. No.: 11/565,853

(22) Filed: Dec. 1, 2006

(65) Prior Publication Data
US 2008/0134080 A1    Jun. 5, 2008

(51) Int. Cl.
*G06F 3/048*    (2013.01)

(52) U.S. Cl.
USPC ........... 715/715; 715/708; 715/710; 715/786; 715/787

(58) Field of Classification Search
USPC ....................................... 715/715
See application file for complete search history.

(56) References Cited

U.S. PATENT DOCUMENTS

| | | | |
|---|---|---|---|
| 7,479,949 B2 * | 1/2009 | Jobs et al. | 345/173 |
| 2006/0200842 A1 * | 9/2006 | Chapman et al. | 725/34 |
| 2007/0078625 A1 * | 4/2007 | Murphy et al. | 702/176 |
| 2007/0180057 A1 * | 8/2007 | McEnroe | 709/218 |
| 2008/0109473 A1 * | 5/2008 | Dixon et al. | 707/102 |

\* cited by examiner

*Primary Examiner* — Anil N. Kumar
(74) *Attorney, Agent, or Firm* — Steven M. Greenberg, Esq.; CRGO Law

(57) ABSTRACT

Embodiments of the present invention address deficiencies of the art in respect to alert bubbles for alert management and provide a novel and non-obvious method, system and computer program product for contextual alerts for alert management. In an embodiment of the invention, an alert management data processing system can be provided. The system can include an alert bubble configured to display alert text for an associated alert, and contextual information disposed in the alert bubble interface along with the alert text. In particular, the contextual information can provide context for the associated alert.

14 Claims, 3 Drawing Sheets

CONTEXTUAL ALERT BUBBLES FOR ALERT MANAGEMENT

BACKGROUND OF THE INVENTION

1. Field of the Invention

The present invention relates to the field of alert management for computing events and more particularly to user interface alert bubbles for computing events.

2. Description of the Related Art

Alert management in a computing system refers to the alerting of an end user through a user interface of a computing application of a computing event. Computing applications and systems often encounter computing events worth noting on the part of the end user. Historically, alerting an end user of a computing event required the suspension of an executing application and the presentation of text or a visual display notifying the end user of an alert condition. While effective in a computing environment in which only a single application can execute at a time, for multi-tasking environments, it is not reasonable to permit the interruption of all applications to present an alert.

In traditional windowing operating systems that provide multi-tasking functionality, alert management is incorporated into the operating system itself. In this regard, the operating system can provide an application programming interface (API) for invoking alerts through the operating system user interface. Often in the form of an alert box or an alert balloon, an alert can be provided by invoking a suitable operation through the alert management API. The alert itself, can be raised from a task bar or other similar such structure.

Alerts presented through the task bar of an operating system can suffice for relatively few alerts within a period of time. Notwithstanding, alerts can become intrusive where many alerts issued from multiple applications are presented repeatedly within the operating system interface. In the latter circumstance, end users may be distracted in addressing each alert. To avoid the latter circumstance, advanced alert management logic permits the configuration of the operating system to issue alerts only arising to a specified level of prioritization or importance. An alternative solution is to disable alerts entirely. In both cases, end users may not view important alerts, or otherwise end users may be compelled to view all alerts.

Advanced alert management systems rely upon statistical rating systems to determine whether or not to display an alert. Specifically, each alert can be assigned a rating based upon whether or not an end user had previously designated the alert as one which ought to be suppressed or viewed. The preferences of an end user can change over time, however, and a static rating system can result in the unintended suppression of important alerts. Likewise, a static rating system can result in the unintended viewing of unimportant alerts.

Alert bubbles, the user interface to an alert management system, appear and vanish according to user preferences intended to limit or at least somewhat control the interruptions caused by the appearance of an alert. The manual specification of preferences for alert bubble appearances remains too coarse in application to be truly effective. In this regard, the information presented in an alert bubble generally includes only some text from the content of the alert itself possibly along with a time stamp. Users remain unaware by reference to the alert bubble itself as to whether the underlying alert is of interest. Thus, alert bubbles typically lack enough context to allow the end user to decide whether or not to permit the interruption proposed by the alert bubble.

BRIEF SUMMARY OF THE INVENTION

Embodiments of the present invention address deficiencies of the art in respect to alert bubbles for alert management and provide a novel and non-obvious method, system and computer program product for contextual alerts for alert management. In an embodiment of the invention, an alert management data processing system can be provided. The system can include an alert bubble configured to display alert text for an associated alert, and contextual information disposed in the alert bubble interface along with the alert text. In particular, the contextual information can provide context for the associated alert.

In one aspect of the embodiment, the system also can include a rating control disposed in the alert bubble. In another aspect of the embodiment, the system also can include a suspension control disposed in the alert bubble. In either circumstance, the contextual information can include historical alert text, or a series of historical alert text for the associated alert along with a scroll bar configured to provide scrollable access to historical alert text in the series. In yet another aspect of the embodiment, the system yet further can include an activatable context source control disposed in the alert bubble and configured upon activation to display context for a source of the associated alert, for instance the activity from which the alert was triggered, the location of the object from where inside an activity the alert had been triggered, the context of the object within the activity, the people associated with the activity, and the like. Finally, in even yet another aspect of the embodiment, the system yet further can include an activatable context rules control disposed in the alert bubble and configured upon activation to display an applied rule permitting the alert bubble to display.

In another embodiment of the invention, an alert management method for providing context to alert bubbles can be provided. The method can include receiving an alert notification for an associated alert, determining both alert text for the associated alert along with context for the alert, displaying both the alert text and the context in an alert bubble, and subsequently vanishing the alert bubble. In one aspect of the embodiment, determining the context for the alert can include determining historical alert text for the alert. In another aspect of the embodiment, determining the context for the alert can include determining a series of historical alert text for the alert.

In yet another aspect of the embodiment, the method further can include activating a context source control in the alert bubble. In response to the activation of the context source control, a display of a source of the alert can be provided. Finally, in even yet another aspect of the embodiment, the method further can include activating a context alert control in the alert bubble. As before, in response to the activation of the context alert control, a display of a rule applied to the alert to permit a display of the alert bubble can be provided.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for contextual alert bubbles for alert management. In accordance with an embodiment of the present invention, contextual information can be provided for an alert within an alert bubble in addition to alert text for the alert bubble. Specifically, the alert source for the alert can be rendered accessible from within the alert bubble as can a reason that the alert bubble has been permitted to appear. Additionally, recent alerts can be ordered and rendered accessible from within the alert bubble along with alert text for a most recent alert. In this way, the contextual information can provide an end user viewing the alert bubble with a clear understanding of the importance of an alert associated with the display of the alert bubble.

Figure 1:
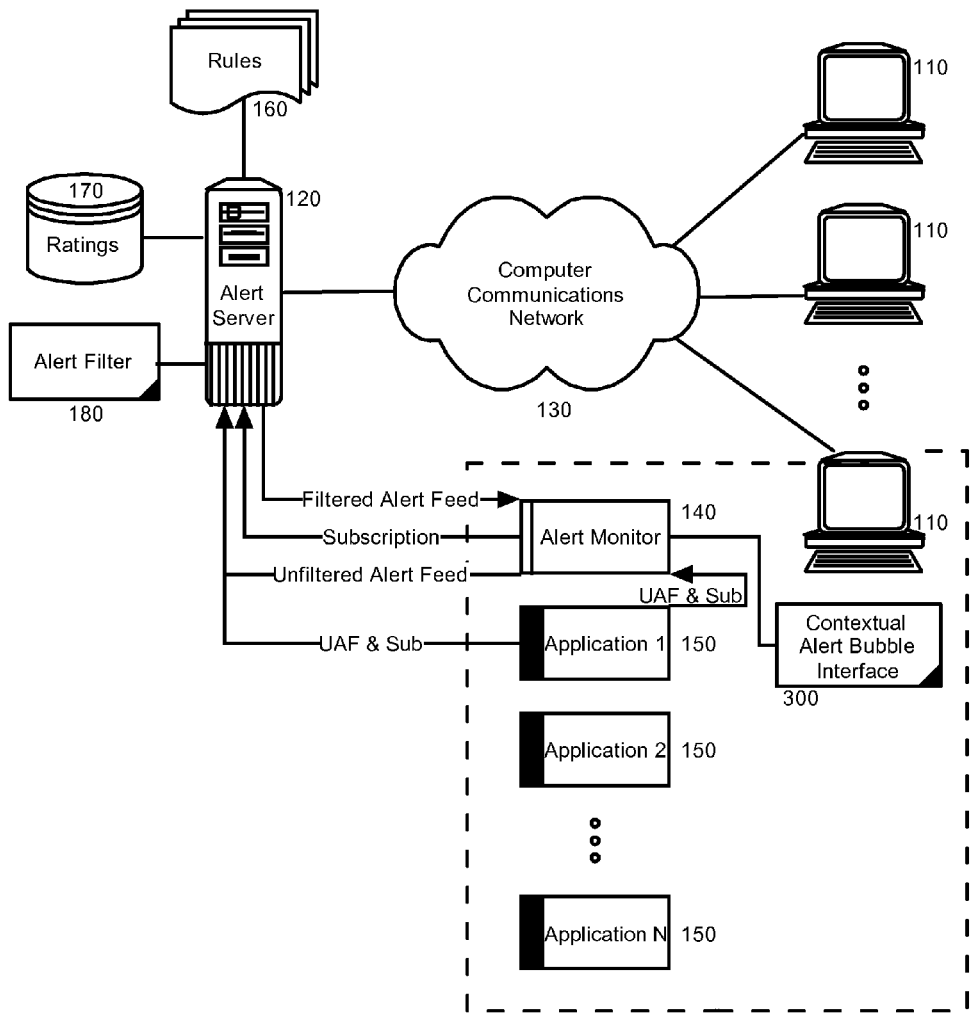
FIG. 1 is a schematic illustration of an alert management data processing system configured with contextual alert bubbles.

In further illustration, FIG. 1 is a schematic illustration of an alert management data processing system configured with contextual alert bubbles. The data processing system can include an alert server 120 coupled to one or more application hosts 110 over a computer communications network 130. Each of the application hosts 110 can host one or more application views 150 to corresponding applications, such as those hosted locally, or those provided by an application server in a composite aggregation environment. Each of the application hosts 110 further can include an alert monitor 140. The alert monitor 140 can include program code enabled to subscribe to one or more alerts in the alert server 120 on behalf of one or more of the applications associated with the application views 150. In one aspect of the invention, the subscription can be that of a subscription of a really simple syndication (RSS) compliant feed or an Atom compliant feed.

The alert server 120 can include both a set of filter rules 160 for one or more alerts defining whether to suppress or display a respective unfiltered alert, and a data store of statistical ratings 170 for previously filtered alerts. Predictive alert filter logic 180 also can be coupled to the alert server 120. The predictive alert filter logic 180 can include program code enabled to train the prediction of an alert filter for an unfiltered alert based upon the statistical ratings 170 for previously filtered alerts. Utilizing the predictive alert filter 180, it can be predicted whether or not to filter an unfiltered alert without exclusively relying upon the presence of a static filter rule for the unfiltered alert. In fact, the ratings 170 produced by the predictive alert filter 180 can be used to statistically determine whether or not to suppress or display an alert even in the complete absence of a static filter rule for the unfiltered alert.

In operation, the alert monitor 140 within an application host 110 can subscribe to an alert on behalf of an application and corresponding one of the application views 150 with the alert server 120. The alert server 120, in turn, can process incoming alerts from the alert monitor 140 in order to determine whether or not to render an alert for the corresponding one of the application views 150 within a contextual alert bubble interface 300. To manage the receipt of a multiplicity of alerts, an alert queue (not shown) can be established to queue unfiltered alerts prior to adaptively managing the processing of the unfiltered alerts.

Figure 2:
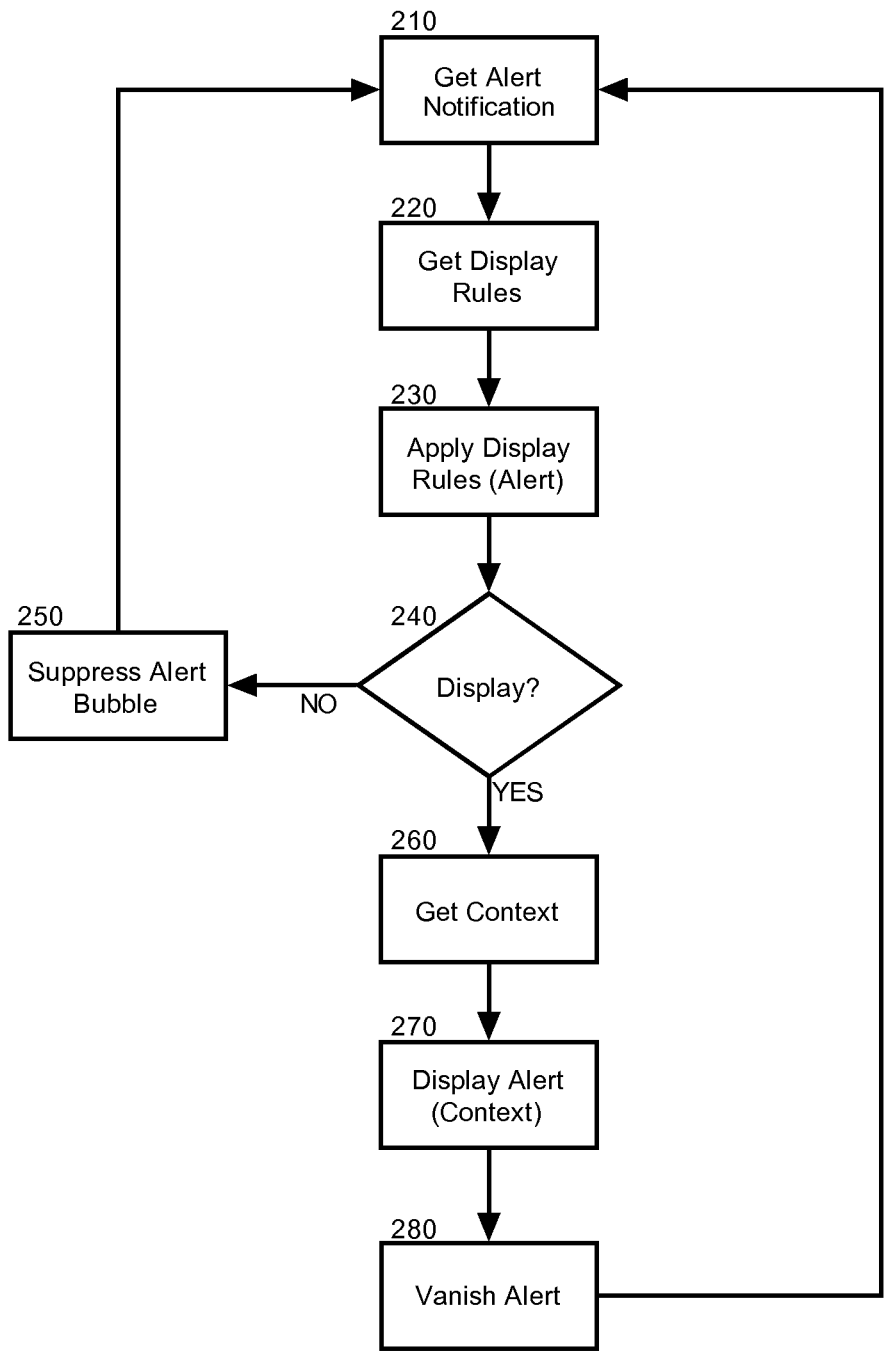
FIG. 2 is a flow chart illustrating a process for managing contextual alert bubble interactions in an alert management system; and, FIGS. 3A through 3E, are pictorial illustrations of different embodiments of a contextual alert bubble.

The contextual alert bubble interface 300 can provide a contextually rich alert bubble that can include not only alert text associated with a received alert, but also contextual data helpful in providing context for the alert text. Examples include providing historical alert text, providing an indication of the source application or source data for the alert, and providing the particular one of the rules 160 giving rise to the display of the contextual alert bubble interface 300. In more particular illustration, FIG. 2 is a flow chart illustrating a process for providing contextual alert bubbles in an alert management system.

Beginning in block 210, an alert notification can be received for an alert. In block 220, display rules can be retrieved for the alert to determine whether or not to display the alert. In block 230, the retrieved rules can be applied to the alert. In decision block 240, if it is determined not to display the alert based upon the application of the rules to the alert, in block 250 an alert bubble can be suppressed from display and the process can return to block 210. Otherwise, in block 260, the context for the alert can be retrieved. In this regard, the context can include related past alerts, a source of the alert, or the rule giving rise to the determination to display the alert. Thereafter, in block 270 the alert can be displayed along with the retrieved context. Finally, in block 280 the alert can vanish and the process can repeat through block 210.

Turning now to FIGS. 3A through 3E, multiple different exemplary alert bubbles are shown, each depicting a different arrangement of incorporating contextual data with an alert. Considering first FIG. 3A, an alert bubble 300 is shown. The alert bubble 300 can include alert text 310 associated with an alert. Additionally, rating controls 320 can be disposed within the alert bubble 300 along with a suspension control 330. The suspension control can provide a user interface for determining when and for how long to suspend the display of alerts irrespective of the content of an alert, whereas rating controls 320 provide a user interface through which an end user can rate an alert associated with the alert bubble 300 for use by the alert server when considering whether or not to subsequently issue a similar alert.

Figure 3A:
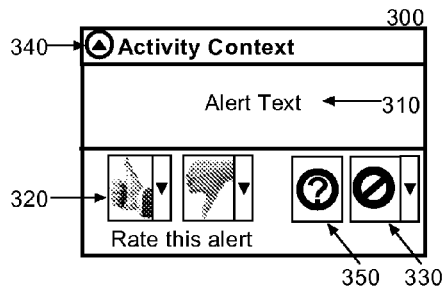
Figure 3B:
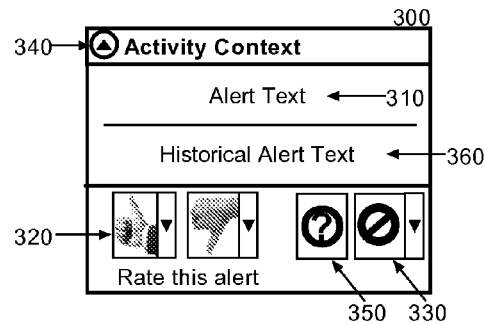
Figure 3C:
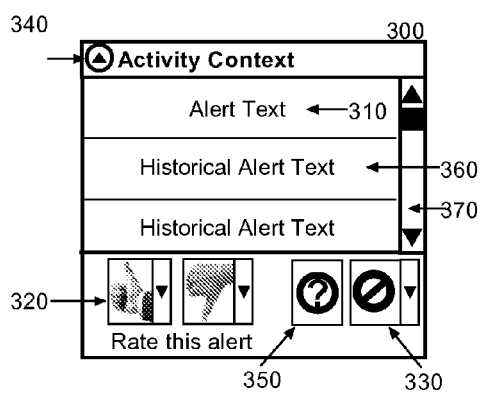
Figure 3D:
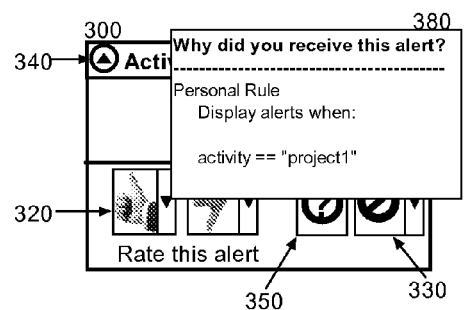
Figure 3E:
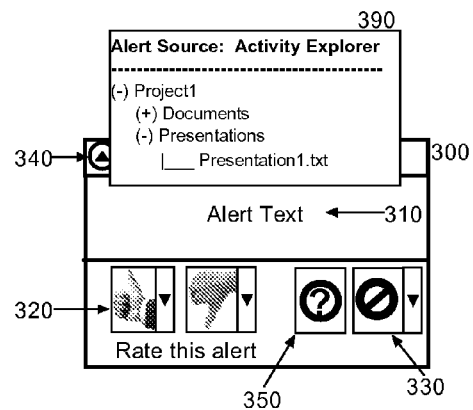

Turning now to FIG. 3B, contextual information for an alert can be provided within the alert bubble 300 along with the alert text 310. The contextual information can include, for example, historical alert text 360 relating to a prior issued alert. Alternatively, as shown in FIG. 3C, the contextual information can include a series of previously issued, historical alert text 360 viewable through the activation of a scroll bar 370 embedded in the alert bubble 300. Notably, the alert bubble 300 of FIG. 3A, FIG. 3B and FIG. 3C also can include a context source control 340 and a context rules control 350.

The context source control 340, when activated, can result in the display of a source for the alert, whereas the context rules control 350, when activated, can result in the display of a rule applied in allowing the display of the alert. Specifically, referring to FIG. 3E, an alert source pop-up 390 can be provided responsive to the activation of the context source control 340 and can provide a source indication for the alert associated with the alert text 310. Likewise, referring to FIG. 3D, an alert rules pop-up 380 can be provided responsive to the activation of the context rules control 350 and can provide an indication of the rules applied when permitting the display of the alert associated with the alert text 310.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include memory devices, wherein the memory devices include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. An alert management data processing system comprising:
   an alert server comprising a processor and memory and communicatively linked to a plurality of application hosts over a computer communications network, the alert server receiving alerts from different alert monitors executing respective ones of the application hosts;
   a contextual alert bubble interface coupled to the alert server, the interface producing an alert bubble configured to display alert text for an associated alert receiving from one of the different alert monitors; and,
   contextual information disposed in the alert bubble interface along with the alert text, the contextual information providing context for the associated alert, the contextual information comprising historical alert text of previously issued alerts.

2. The system of claim 1, further comprising a rating control disposed in the alert bubble.

3. The system of claim 1, further comprising a suspension control disposed in the alert bubble.

4. The system of claim 1, further comprising:
   a series of historical alert text for the associated alert; and,
   a scroll bar configured to provide scrollable access to historical alert text in the series.

5. The system of claim 1, further comprising an activatable context source control disposed in the alert bubble and configured upon activation to display a source for the associated alert.

6. The system of claim 1, further comprising an activatable context rules control disposed in the alert bubble and configured upon activation to display an applied rule permitting the alert bubble to display.

7. An alert management method for providing context to alert bubbles, the method comprising:
   receiving an alert notification in an alert server with a processor and memory for an associated alert from an alert monitor from over a computer communications network;
   determining both alert text for the associated alert along with context for the alert the context comprising historical alert text of previously issued alerts;
   displaying both the alert text and the context in an alert bubble; and,
   subsequently vanishing the alert bubble.

8. The method of claim 7, wherein determining the context for the alert comprises determining a series of historical alert text for the alert.

9. The method of claim 7, further comprising:
   activating a context source control in the alert bubble; and,
   responsive to the activation of the context source control, popping-up a display of a source of the alert.

10. The method of claim 7, further comprising:
    activating a context alert control in the alert bubble; and,
    responsive to the activation of the context alert control, popping-up a display of a rule applied to the alert to permit a display of the alert bubble.

11. A computer program product comprising a memory device having computer usable program code for alert management for providing context to alert bubbles, the computer program product including:
    computer usable program code for receiving an alert notification for an associated alert;
    computer usable program code for determining both alert text for the associated alert along with context for the alert, the context comprising historical alert text of previously issued alerts;
    computer usable program code for displaying both the alert text and the context in an alert bubble; and,
    computer usable program code for subsequently vanishing the alert bubble.

12. The computer program product of claim 11, wherein the computer usable program code for determining the context for the alert comprises computer usable program code for determining a series of historical alert text for the alert.

13. The computer program product of claim 11, further comprising:
    computer usable program code for activating a context source control in the alert bubble; and,
    computer usable program code for, in response to the activation of the context source control, popping-up a display of a source of the alert.

14. The computer program product of claim 11, further comprising:
   computer usable program code for activating a context alert control in the alert bubble; and,
   computer usable program code for, in response to the activation of the context alert control, popping-up a display of a rule applied to the alert to permit a display of the alert bubble.

* * * * *